(12) United States Patent
Spengler et al.

(10) Patent No.: US 11,547,964 B2
(45) Date of Patent: Jan. 10, 2023

(54) ACTUATED AIR FILTER DUST VALVE

(71) Applicant: Caterpillar Inc., Deerfield, IL (US)

(72) Inventors: Philip C. Spengler, Washington, IL (US); Jeffrey R. Ries, Metamora, IL (US); Jon T. Immel, Chillicothe, IL (US); Javier A. Rodríguez, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 224 days.

(21) Appl. No.: 16/534,706

(22) Filed: Aug. 7, 2019

(65) Prior Publication Data

US 2021/0039030 A1 Feb. 11, 2021

(51) Int. Cl.

| *B01D 46/24* | (2006.01) |
|---|---|
| *B01D 50/20* | (2022.01) |
| *F02M 35/08* | (2006.01) |
| *B01D 45/18* | (2006.01) |

(52) U.S. Cl.
CPC ............ *B01D 46/24* (2013.01); *B01D 45/18* (2013.01); *B01D 50/20* (2022.01); *F02M 35/084* (2013.01)

(58) Field of Classification Search
CPC ...... B01D 46/24; B01D 50/002; B01D 45/12; B01D 45/18; F02M 35/084
See application file for complete search history.

(56) References Cited

U.S. PATENT DOCUMENTS

| 1,669,413 | A | | 5/1928 | Donaldson | |
|---|---|---|---|---|---|
| 4,204,849 | A | * | 5/1980 | Johnston | B01D 46/71 |
| | | | | | 175/206 |
| 4,373,187 | A | * | 2/1983 | Ishii | F02D 41/1483 |
| | | | | | 123/480 |
| 4,388,091 | A | | 6/1983 | Khosropour | |
| 5,066,315 | A | * | 11/1991 | Haberl | B04C 5/22 |
| | | | | | 95/271 |
| 5,853,579 | A | * | 12/1998 | Rummler | B01D 46/42 |
| | | | | | 110/235 |
| 9,328,867 | B2 | | 5/2016 | Frenal et al. | |
| 2002/0189214 | A1 | | 12/2002 | Hettmann et al. | |
| 2017/0203241 | A1 | * | 7/2017 | Subedi | B01D 46/46 |

FOREIGN PATENT DOCUMENTS

| CN | 2201490 | 6/1995 |
|---|---|---|
| CN | 109011925 | 12/2018 |
| CN | 208759361 | 4/2019 |
| EP | 1364696 | 11/2003 |
| JP | S60216062 | 10/1985 |

* cited by examiner

*Primary Examiner* — Robert Clemente
(74) *Attorney, Agent, or Firm* — Schwegman Lundberg & Woessner, P.A.

(57) ABSTRACT

An air intake system may include an engine air cleaner having a dust valve. The intake system may be configured for arrangement on the engine. The dust valve may also be operable to open or close based on operating characteristics of the engine.

12 Claims, 5 Drawing Sheets

ACTUATED AIR FILTER DUST VALVE

TECHNICAL FIELD

The present disclosure relates to separating, filtering, and discarding dust and/or particulate matter. More particularly, the present disclosure relates to a dust valve for releasing dust from an air intake system. Still more particularly, the present disclosure relates to a dust valve that is automatic and/or actuatable for releasing dust from an air filtration system.

BACKGROUND

Machines, implements, trucks, other combustion engine-powered devices, standalone combustion engines such as those used for power generation, or other combustion engines include air intake systems. The air intake system draws in outside air and cleans it before delivering the air to the engine for combustion. The cleaning process provides for better combustion and helps to maintain better engine hygiene and long-term performance. Cleaning systems include a pre-cleaner and an air cleaner. A pre-cleaner is a sort of separator that helps to remove dirt, dust, or other larger particles from the incoming air. Pre-cleaners commonly rely on one or more types of inertial separation where the speed of the air in combination with a changing direction of the air causes the larger particles to separate from the flowing air. An air cleaner includes an air filter and helps to remove smaller particles from the incoming air by passing the air through a membrane with a selected porosity. The membrane porosity is selected to balance filtration against maintaining air flow to provide sufficiently clean air to the combustion portion of the engine at a sufficiently high rate and/or pressure.

Dust particles separated from the air in the pre-cleaner often settle into a discharge chute for discarding back into the environment. Dust particles that are relatively large, but small enough to have passed through the pre-cleaner collect on the surface of the air filter. Due to their relatively large size, these dust particles often fall from the surface of the air filter when air flow slows down or stops and these particles collect in the discharge chute as well.

To maintain a relatively debris free air intake system, the discharge chute is emptied from time to time and a dust valve is commonly used. Current dust valves include a gravity-based duckbill-shaped valve that remains closed under particular negative pressures and opens when the negative pressure is removed or when the negative pressure falls below a particular amount. However, these valves are prone to failure for several reasons. First, the operation of the valve is based on the resiliency of a polymer material, which wears out over time causing the valve to fail to open and, thus, fail to release dust from the discharge chute. Second, even when operating as intended, the small cross-sectional area of the valve can be ineffective or insufficient for releasing the dust or it can cause the dust valve to become clogged.

Other related technologies may include U.S. Pat. No. 9,328,867. This patent relates to a filling connector, container, filling method and filling nozzle with a dust valve element that can be moved selectively towards downstream.

SUMMARY

In one or more embodiments, an air intake system may include an engine air cleaner having a dust valve and configured for arrangement on an engine. The dust valve may be operable to open or close based on operating characteristics of the engine.

In one or more embodiments, a dust valve for an air intake system may include a body portion defining a passageway for discarding dust. The dust valve may also include an operable portion arranged within the body portion and configured to open and close the passageway. The dust valve may also include an actuation portion operably coupled to the operable portion to operate the operable portion between an open position and a closed position.

In one or more embodiments, a method of filtering air and discarding dust may include receiving air into an air cleaner and collecting dust into a discharge chute. The method may also include actuating a dust valve a to discharge the dust.

DETAILED DESCRIPTION

Figure 1:
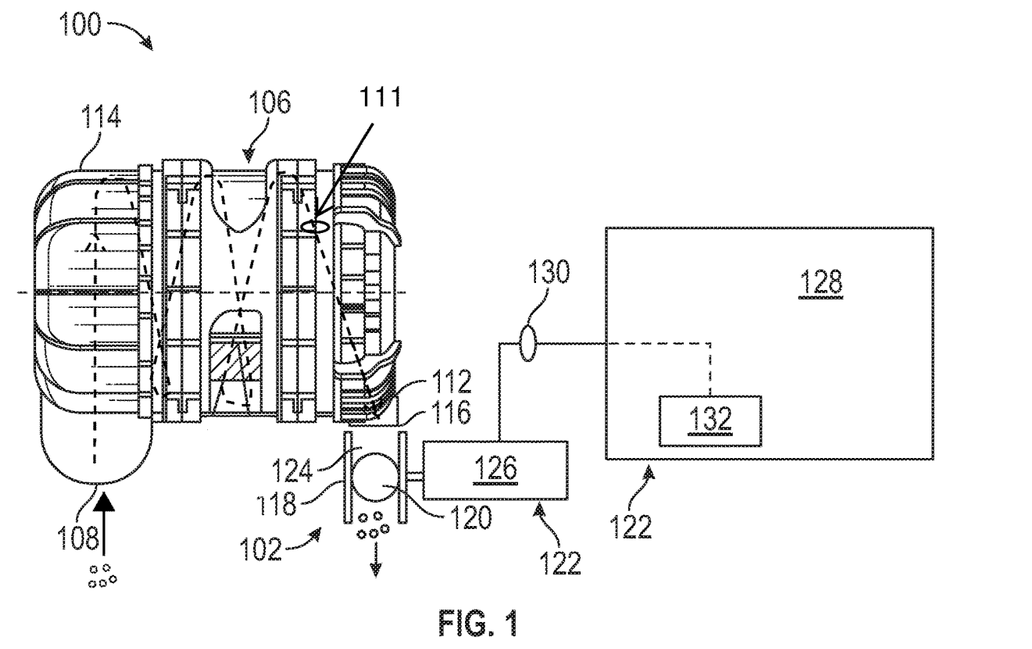
FIG. 1 is a schematic side view of an open dust valve having a controlled actuation device and being arranged on an air intake system, according to one or more embodiments.
Figure 2:
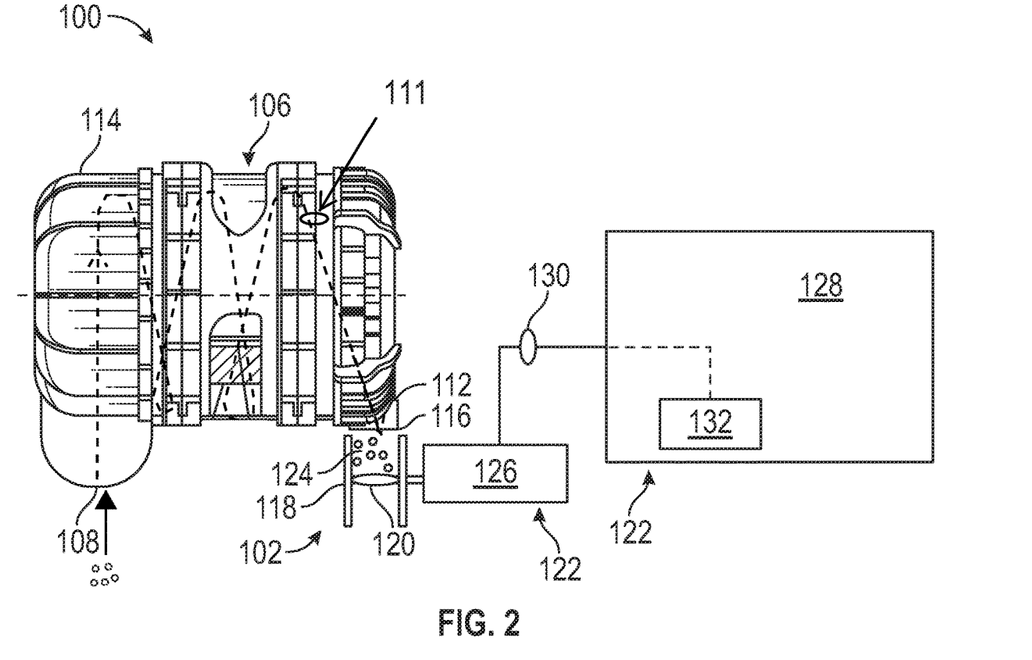
FIG. 2 is a schematic side view of a closed dust valve having a controlled actuation device and being arranged on an air intake system, according to one or more embodiments.

Referring now to FIGS. 1-2, a schematic side view is shown of a dust discarding portion or valve 102 arranged on an air intake system 100, according to one or more embodiments. The air intake system 100 shown is configured to separate and discard dust from incoming air and deliver cleaned air to the combustion system of an engine, for example. The air intake system 100 may include a pre-cleaner, an air cleaner 106, and a dust discarding portion 102. However, in the embodiment shown in FIGS. 1-4, an air cleaner has been omitted.

Dust or particulate matter, particularly larger particulate matter, may be separated from intake air by a pre-cleaner. However, where, as here, a pre-cleaner has been omitted, or for dust that is not captured by the pre-cleaner, an air cleaner 106 can be provided. The air cleaner may include a housing 114 and an air filter arranged inside the housing. The housing may define a fluid or air pathway extending from an intake port 108 and leading toward the combustion portion of the engine. The housing may guide air around and through the air filter as shown by an example flow path 111. As air is drawn from the flow path through the air filter, the dust in the air may be left behind and may continue along the flow path 111 to the discharge chute. The housing 114 may also be adapted to position the air filter in the fluid or air pathway to force the air through the filter. The housing may include a removable access panel to allow access to the air filter for removal and/or replacement.

In one or more embodiments, the air filter is positioned within the housing and includes a filtration membrane or media adapted to allow air through the filter while also filtering out harmful dust or other particulate matter. The air filter can have a porosity selected based on engine and/or combustion requirements and/or desired efficiencies. The air filter membrane may include a switchback folded or fluted shape to increase the available surface area for passage of air. The porosity and available area may be selected based on air pressures and design flow rates such that clean filtered air may be provided to the combustion portion of the engine at the desired rate and pressure.

The housing 114 of the air cleaner may be shaped to establish a dust chute 112. The dust chute 112 may include a trough-shaped area in a bottom of the chamber and the housing leading to an outlet 116. The trough-shaped area may be configured to receive falling dust that either falls from the slowing air in the housing or falls from the surface of the air filter when air flow slows down or stops. The trough-shaped area may guide the dust toward the outlet 116. For example, the dust chute may be angled or sloped and may include a funnel portion at or near the outlet 116 to guide dust from one or more directions toward the outlet.

In one or more embodiments, a dust valve 102 is provided on the outlet 116. The dust valve may be adapted to selectively, automatically, and/or controllably discard dust from the air intake system and back into the environment. That is, during operation of the engine, the dust valve can be closed to allow the air intake to function by drawing in air through the intake port, pre-clean the air, and filter the air. In situations where the engine is not operating or, for example, has returned to idle or has lower revolutions per minute (RPM), the valve may open to allow collected dust to be discarded. As shown in FIG. 1, in or more embodiments, the dust valve 102 is arranged on the outlet 116 of the discharge chute and includes a body portion 118, an operable portion 120, and an actuation portion 122.

The body portion 118 of the valve may be adapted for permanent and/or removable arrangement on the outlet 116 of the of the intake system 100. The body portion 118 may also be configured for containing the operable portion 120 of the valve and for placing the operable portion 120 of the valve in sealed fluid communication with the outlet 116. As shown, the body portion 118 includes a sidewall portion forming a fluid passageway leading away from the outlet 116. The sidewall may have a cylindrical, rectangular, or other cross-sectional shape. In one or more embodiments, the sidewall may have a cross-sectional size and shape that is the same or similar to the discharge chute 112. In one or more embodiments, the outlet 116 includes a peripheral lip extending radially outward from the outlet 116. The body portion 112 of the dust valve may include an inwardly protruding peripheral lip adapted to resiliently stretch and slip over the lip on the outlet and nest in behind the outlet lip and resist removal of the dust valve. A second internal lip may also be provided to prevent or resist over advancement of the dust valve onto the outlet and, as such, may function with the inwardly protruding peripheral lip to secure the dust valve on the outlet 116 in a particular position. The dust valve sidewall may extend longitudinally away from the outlet 116 when in place on the system and may be adapted to form a free passageway 124 for dust and other particulate matter in the chute 112 to pass out of the system 100.

As mentioned, the operable portion 120 of the valve may be arranged in the body portion 118 to be in sealed fluid communication with the outlet 116. The operable portion 120 of the valve may be adapted to selectively, automatically, or controllably close off or open the passageway 124 through the body portion 118. Depending on the type of operable portion provided, the operable portion can be adjusted to fully or partially close or open the passageway. In one or more embodiments, as shown in FIGS. 1-4, a butterfly-type operable portion 120 is provided. In this embodiment, the operable portion 120 may be a substantially thin disc portion securely arranged on a shaft. The shaft may extend transversely across the passageway 124 and through the sidewall of the body portion. Where a cylindrical body portion is provided, the disc portion may be round and may have a diameter that is substantially the same as an inner diameter of the body portion 118. Alternatively, where a square or rectangular body portion is provided, the disc may be square or rectangular having dimensions similar to the inner dimensions of the body portion. In either case, the shaft can be rotated to control the position of the operable portion 120 within the body portion 118. As shown in FIG. 1, for example, when the shaft is rotated to align a plane of the disc with the longitudinal axis of the body portion 118, a substantially and/or fully open passageway 124 is provided. In contrast, when the shaft is rotated approximately 90 degrees, the disc may be rotated to substantially and/or fully close off the passageway 124. It is to be appreciated that the above design differs from conventional dust valves in that the valve is able to substantially fully open the discharge chute to the surrounding environment and provide a wide open and substantially unrestricted chute for discharging dust. That is, even in an open condition, current duckbill type dust valves restrict the cross-sectional area of the discharge chute, which can cause dust and other particular matter to hang up or fail to discharge from the system.

While a butterfly-type operable portion 120 has been described, other types of operable portions may be provided. For example, a ball-valve type operable portion may be provided where the operable portion comprises a ball with a bore extending through its center. The bore may have an inner diameter that is the same or similar to the inner diameter of the body portion 118. The body portion 118 may be enlarged near the operable portion 120 to accommodate the ball-type portion. The ball-valve type operable portion may be arranged to articulate between at least two positions. In an open position, the bore may be arranged substantially parallel with the passageway 124 of the body portion and in a closed position, the bore may be arranged substantially perpendicular to the passageway 124. A control shaft may extend through the body portion and the ball-type portion may be securely coupled to the shaft such that the shaft may be used to control the position of the ball-type operable portion. Still other types of valves may be provided such as a gate valve, globe valve, needle valve, cock/plug valve, check valve, or a flap valve, as well as other valve types. In one or more embodiments, a valve that allows for a fully or substantially unobstructed passageway such as a ball valve, butterfly valve, check valve, flap valve, or gate valve is provided.

The actuation portion 122 may be configured to control the position of the operable portion 120. For example, the actuation portion 122 may interact with a shaft or other aspect of the operable portion 120 to rotate, slide, or otherwise adjust the position of the operable portion 120 within the body portion 118 and, as such, control the flow of dust through the passageway 124. The actuation portion 122 may allow for selected, automatic, and/or controlled operation of the operable portion 120 of the valve.

In one or more embodiments, as shown in FIGS. 1 and 2, the actuation portion 122 is a computer-controlled device. That is, the actuation portion may include a device adapted to control the operable portion responsive to engine operation characteristics or conditions. In this embodiment, the actuation portion may include a controlled device 126 and a controlling computing or signal device 128.

The controlled device 126, in one or more embodiments, includes a motor or servo motor. The motor may be operably coupled to the operable portion 120 of the valve with a shaft and actuation of the motor may cause the shaft to rotate, thereby adjusting the position of the operable portion 120 of the valve. The motor or servo motor may be adapted to be responsive to computer signals to fully or partially close or open the operable portion of the valve. In one or more embodiments, the motor or servo motor is coupled to a power source such as the electrical system of the associated implement or machine.

While a motor or servo motor has been described, a more simplistic controlled device 126 can be provided. For example, where partially open and closing of the operable portion is not desired, a solenoid arranged to control a radially arm extending from the shaft may be provided. As such, when power is provided to the solenoid, it may actuate to move the radial arm, rotate the shaft, and open or close the operable portion 120 of the valve. When power is turned off to the solenoid, it can return to its idle position returning the operable portion 120 to its original closed or open position. Still other controlled devices 126 actuatable by a computing or signal device may be provided.

In one or more embodiments, the controlled device 126 includes a control input feature or system 130 allowing the controlled device to receive control inputs from a controlling computing or signal device. The input feature 130 may include a wired input or a wireless input may be provided. Depending on the nature of the received signal, the controlled device 126 may include a processing device or system for directing a response by the controlled device 126 based on the received signal.

The controlling computing or signal device 128 may include an engine control module associated with the implement or machine on which the air intake system is provided. The engine control module may include a dust valve control module 132 configured for controlling the controlled device 126. In one or more embodiments, the dust valve control module 132 monitors engine operation and controls the controlled device responsive to that operation. In one or more embodiments, the active control of the dust valve is configured to mimic conventional dust valve operation, but provide more confidence and assurance of proper operation. In one or more embodiments, for example, when the engine RPM is zero or at idle, the dust valve control module 132 can issue an open signal to the controlled device causing the operable portion of the valve to be opened. As the engine RPM of the machine or implement increases above an idle condition, the dust valve control module 132 may issue a closed signal to the controlled device causing the operable portion of the valve to close. In one or more other embodiments, pressure sensors may be provided on the intake system and the dust valve control module 132 may monitor the pressures based on information provided by the sensors. A negative pressure threshold may be provided and when the negative pressure value in the intake system approaches or exceeds the threshold, the dust control valve module 132 may issue a close signal causing the actuation portion to close the operable portion of valve. Still other parameters such as airflow into the pre-cleaner or other parameters of engine operations may be relied on by the dust valve control module 132 for signaling the actuation system.

Figure 3:
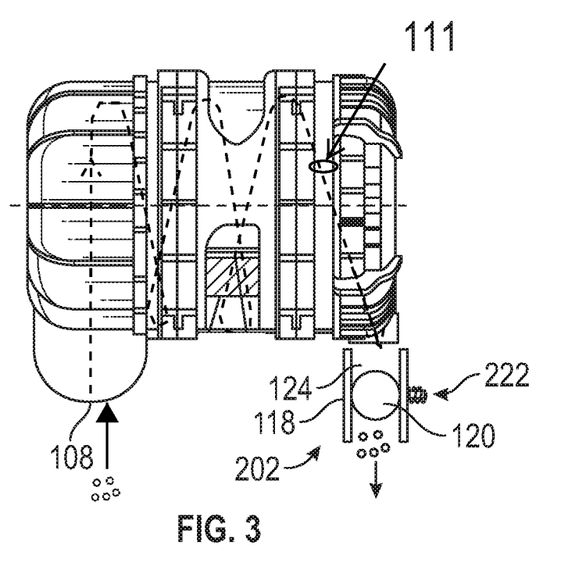
FIG. 3 is a schematic side view of an open dust valve having a physically responsive actuation device and being arranged on an air intake system, according to one or more embodiments.
Figure 4:
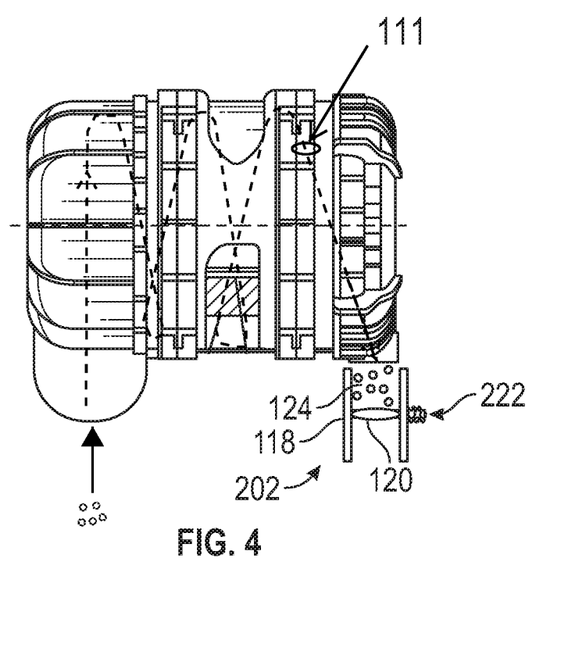
FIG. 4 is a schematic side view of a closed dust valve having a physically responsive actuation device and being arranged on an air intake system, according to one or more embodiments.

Referring now to FIGS. 3-4, another embodiment of dust valve 202 is shown. In this embodiment, the several elements of the valve 202 are the same or similar to the valve 102. However, the actuation system 222 is slightly different. In this embodiment, the actuation system 222 is a physically responsive actuation system rather than a controlled device. As shown, for example, the actuation system may include a biasing spring that may bias the operable portion 120 in an open position as shown in FIG. 3. That is, for example, a spring is arranged on the shaft of the operable portion 120 and is secured at one end to a stationary element such as the body portion, for example, and at the other end to the shaft. In one or more embodiments, when the spring is in its natural, at rest, unstrained condition, the operable portion 120 of the valve may be in an open position. In other embodiments, stops may be provided on the operable portion 120 such that some strain may be present in the spring when the operable portion is in the open position. In either case, when negative pressure begins to develop in the air intake system due to the engine drawing in air for combustion, the spring force may be overcome causing the operable portion 120 to be drawn to a closed position. While a butterfly-type operable portion is shown in FIGS. 3 and 4, alternatively, a check valve or flap valve may be provided. For example, a check or flap valve may be provided in a sort of trap door fashion, where gravity and the spring bias the valve in an open condition and negative pressure within the air intake system draws the operable portion closed. Still other physically responsive actuation portions may be provided.

Figure 5:
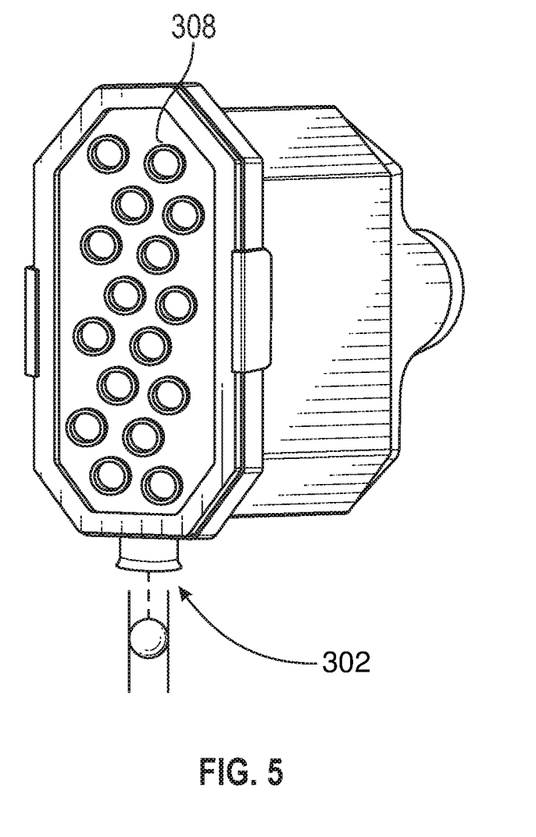
FIG. 5 is a perspective view of the dust valve of the current disclosure arranged on another type of air intake system, according to one or more embodiments.
Figure 6:
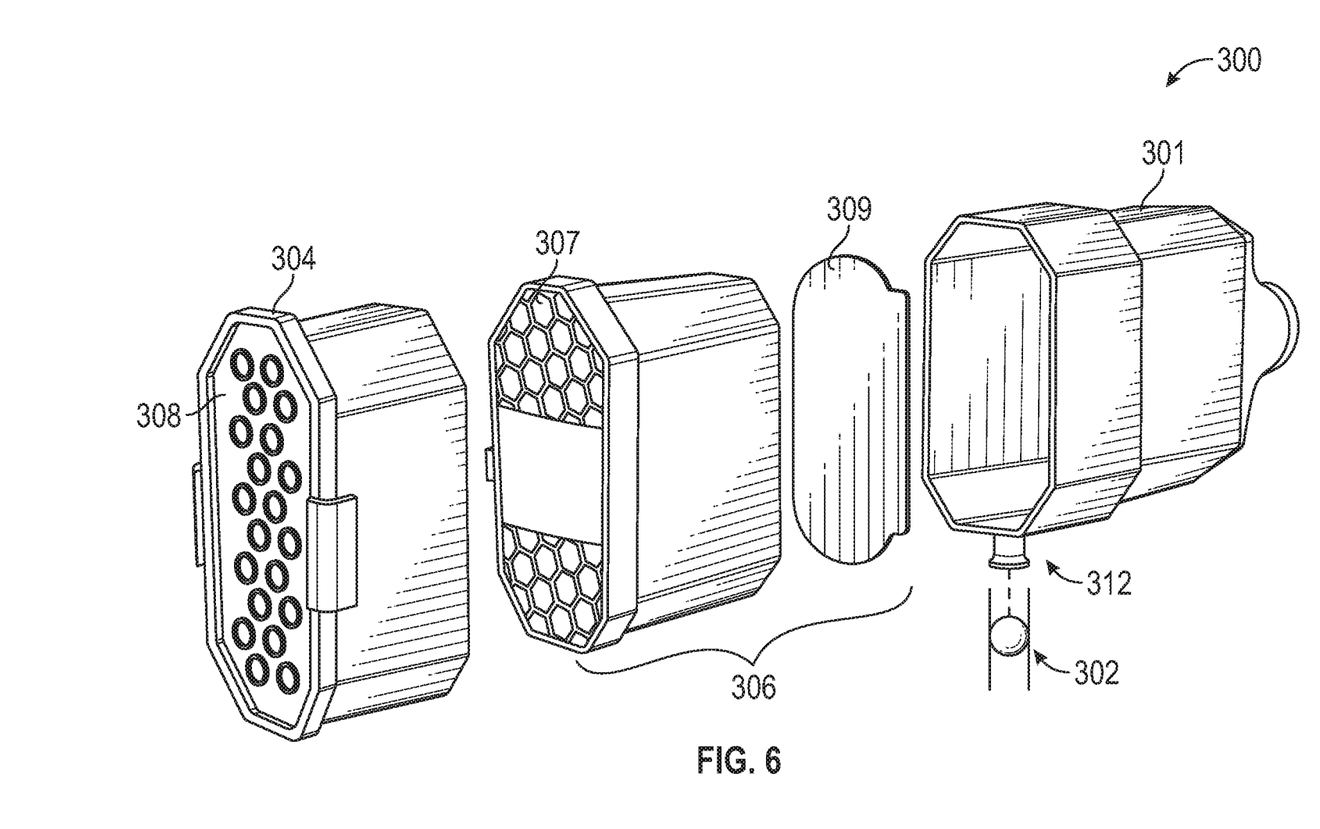
FIG. 6 is an exploded view of the air intake system of FIG. 5, according to one or more embodiments.

Referring to FIGS. 5 and 6, an additional air intake system 300 is shown. FIG. 5 shows the system 300 in an assembled view and FIG. 6 shows an exploded view. As shown, in one or more embodiments, the air intake system 300 includes a housing 301, a pre-cleaner 304, an air cleaner 306, and a discard chute 312. As shown, the discard chute 312 is shown extending downward from the housing 301 and a dust valve 302 according to one or more embodiments of the present disclosure is shown.

In this embodiment, and in contrast to the embodiments of FIGS. 1-4, a pre-cleaner 304 is shown. The pre-cleaner 304 may include an inertial separation system for separating larger debris, dust, or particulate matter from the incoming air. That is, the pre-cleaner may be configured to induce motion in the air and use the inertia of larger matter in the air to help separate the matter from the air. As shown, and in one or more embodiments, the pre-cleaner includes a plurality of tubes 308 that are configured for inducing spiraling, rotating, cyclonic, or other motion to separate large particulate matter from the air before the air reaches the air cleaning filter media. The tubes 308 may have an internal shape and structure that creates the spiraling, rotating, cyclonic, or other motion in the air causing the larger particulate matter to separate from the air. As shown in FIG. 5, the pre-cleaner may be arranged in a front portion of the housing and dust removed by the pre-cleaner may fall to the bottom of the housing 301 to exit at the chute 312.

While a tube-type pre-cleaner is shown, other types of pre-cleaners can be provided. For example, the pre-cleaner can include an intake port and a separation chamber. The intake port can include an opening and a pipe, channel, or other conduit leading from the opening to the chamber. The conduit may convey air from outside of the intake system to the chamber. In one or more embodiments, the opening includes a grill, grate, or other perforated covering to prevent entry of large debris. The conduit may approach the separation chamber generally tangentially. That is, the separation chamber may include a cylindrical, conical, or other shape having a round cross-section. The conduit can have a first side generally tangentially aligned with an outside surface of the chamber and a second side set radially inward (e.g., relative to the center of the chamber) from the first side. As such, the conduit may deliver the air to the chamber along a smooth pathway which transitions from a straight pathway within the conduit to a curved pathway around the internal volume of the chamber. As such, the air may be delivered to the chamber with a generally laminar flow. As the air travels around the chamber, the momentum of the matter in the air causes it to tend toward a straight line rather than follow the path of the air around the inside of the chamber and, as such, the matter in the air is drawn to the outer periphery of the internal volume of the chamber. Heavier matter more quickly separates from the air flow and falls to the bottom of the chamber and is funneled toward a discharged chute. That is, the chamber may include a dust collection area arranged in a bottom portion thereof, which may be trough shaped to collect dust and funnel it toward a discharge chute.

The air cleaner in FIG. 6 is arranged downstream of the pre-cleaner. The air cleaner may be adapted to receive air exiting the pre-cleaner and pass the air through one or more filter media. As shown, in one or more embodiments, a primary filter media 307 may be provided and a secondary filter media 309 may also be provided. The filter media functions to remove additional and potentially finer particulate and/or dust from the incoming air before passing the air to the combustion portion of the engine. The dust filtered by the filter media may fall to the bottom of the housing once filtered and/or it may collect on the filter media. In one or more embodiments, the dust may fall from the face of the filter media when airflow slows or stops, for example.

The housing 301 may be adapted to receive the pre-cleaner and the air cleaner and may include a chute 312 arranged in a bottom portion thereof for collecting dust and directing the dust through a valve. As shown, the valve 302 can be arranged on the discharge chute 312. The valve 302 can be the same or similar to the valves 102/202 described with respect to FIGS. 1-4. That is, a dust valve 102 with a controlled device type actuation system or a dust valve 202 with a physically responsive device type actuation system may be provided.

INDUSTRIAL APPLICABILITY

Figure 7:
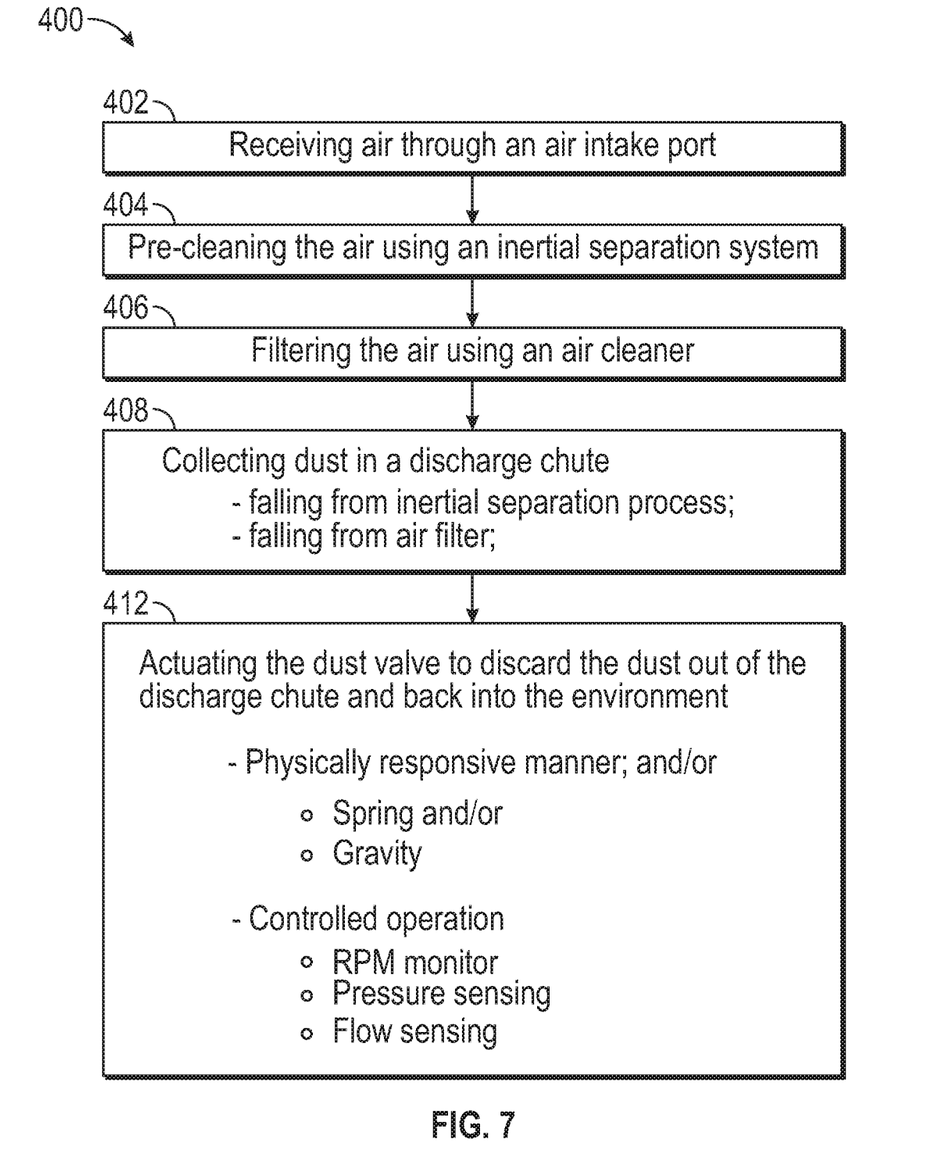
FIG. 7 is a flow diagram depicting one or more operations involved in a method of filtering air, according to one or more embodiments.

In operation and use, the above-described air intake system may operate to pre-clean and filter air for a combustion engine and also selectively, automatically, and/or controllably release accumulated dust. In one or more embodiments, a method 400 of filtering air includes receiving air through an air intake port 402. The method may also include pre-cleaning the air using an inertial separation system 404 and may further include filtering the air using an air cleaner 406. During these two processes, the system may be collecting dust in a discharge chute 408. In one or more embodiments, when dust is being collected, a dust valve on the end of the discharge chute may generally be closed. Under particular circumstances and conditions, the method includes actuating the dust valve to discard the dust out of the discharge chute and back into the environment 412. In one or more embodiments, actuating the dust valve is performed in a physically responsive manner based on air flows and/or pressures developed within the air intake system. For example, when the engine is running above an idle condition and negative pressures are created in the air intake system, the negative pressure may physically draw the dust valve closed and when the negative pressure is released, the valve may reopen. Additionally or alternatively, actuating the dust valve may be a controlled operation. That is, together with or separate from the physically responsive system, a controlled open/closing operation can be implemented. For example, a dust control valve module can monitor the RPM's of the engine and open or leave open the valve when the RPM's are zero, at an idle condition, or another selected condition. When the RPM's increase above zero, idle, or the selected condition, the dust control valve module may issue a close signal causing the actuation system to close an operable portion of the valve. Additionally or alternatively, the dust control valve module monitors pressures in the intake system and closes the valve when the module senses a negative pressure in the intake system and opens the valve when the negative pressure is released. Additionally or alternatively, the dust control valve monitors air flows in the intake system and when inwardly travelling air is coming into the intake system, the module closes the dust control valve. Still other engine parameters and/or characteristics can be relied on to control the dust valve operation.

What is claimed is:

1. An air intake system, comprising:
   an engine air cleaner having a dust valve and configured for arrangement on an engine, the dust valve being operable to open or close based on operating characteristics of the engine and comprising:
   a body portion defining a passageway for discarding dust;
   an operable portion arranged within the passageway and configured to open and close the passageway by moving between an open position within the passageway and providing a substantially unobstructed pathway to a closed position within the passageway; and
   an actuation portion comprising:
   a controlled device configured to operate the operable portion between the open position and the closed position; and
   a dust valve control module that monitors the operating characteristics of the engine and issues corresponding control signals to the controlled device for opening and closing the operable portion.

2. The intake system of claim 1, wherein the operating characteristics comprise engine RPM's.

3. The intake system of claim 1, wherein the operating characteristics comprise air pressure.

4. The intake system of claim 1, wherein, the air cleaner comprises a dust discarding chute and the dust valve is arranged on the dust discarding chute.

5. The intake system of claim 1, wherein the controlled device is a servo motor.

6. The intake system of claim 1, wherein the controlled device is a solenoid.

7. The intake system of claim 1, wherein the dust valve control module is part of an engine control module.

8. The intake system of claim 1, wherein the operable portion is a valve.

9. The intake system of claim 8, wherein the valve is a butterfly valve.

10. The intake system of claim 8, wherein the valve is a ball valve.

11. The intake system of claim 1, wherein the operating characteristics comprise air flow.

12. An air intake system, comprising:
- an engine air cleaner having a dust valve and configured for arrangement on an engine, the dust valve being operable to open or close based on operating characteristics of the engine and comprising:
- a body portion defining a passageway for discarding dust;
- an operable portion configured to open and close the passageway; and
- an actuation portion comprising:
  - a controlled device configured to operate the operable portion between an open position and a closed position; and
  - a dust valve control module that monitors the operating characteristics of the engine and issues corresponding control signals to the controlled device for opening and closing the operable portion.

* * * * *